United States Patent
Park

(10) Patent No.: US 11,949,513 B2
(45) Date of Patent: Apr. 2, 2024

(54) METHOD AND DEVICE FOR TRANSMITTING HARQ FEEDBACK INFORMATION IN UNLICENSED BAND

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 688 days.

(21) Appl. No.: 17/055,810

(22) PCT Filed: May 14, 2019

(86) PCT No.: PCT/KR2019/005760
§ 371 (c)(1),
(2) Date: Nov. 16, 2020

(87) PCT Pub. No.: WO2019/221475
PCT Pub. Date: Nov. 21, 2019

(65) Prior Publication Data
US 2021/0218502 A1    Jul. 15, 2021

(30) Foreign Application Priority Data

May 17, 2018 (KR) .......... 10-2018-0056288
Nov. 28, 2018 (KR) .......... 10-2018-0150160
May 13, 2019 (KR) .......... 10-2019-0055567

(51) Int. Cl.
*H04L 1/1812* (2023.01)
*H04L 5/00* (2006.01)
(Continued)

(52) U.S. Cl.
CPC .......... *H04L 1/1812* (2013.01); *H04L 5/0005* (2013.01); *H04W 72/0453* (2013.01); *H04W 72/23* (2023.01)

(58) Field of Classification Search
None
See application file for complete search history.

(56) References Cited

U.S. PATENT DOCUMENTS

2013/0308464 A1* 11/2013 Park .................. H04L 1/1896
                                                    370/329
2016/0277169 A1    9/2016 Park
(Continued)

FOREIGN PATENT DOCUMENTS

CN    107295663 A    10/2017
CN    107667565 A    2/2018
(Continued)

OTHER PUBLICATIONS

A. Mukherjee, F. Lindqvist and J. - F. Cheng, "HARQ Feedback in Unlicensed Spectrum LTE: Design and Performance Evaluation," 2017 IEEE Wireless Communications and Networking Conference (WCNC), San Francisco, CA, USA, 2017, pp. 1-6, doi: 10.1109/WCNC.2017.7925648. (Year: 2017).*

(Continued)

*Primary Examiner* — Daniel F. McMahon
(74) *Attorney, Agent, or Firm* — IP Legal Services, LLC

(57) ABSTRACT

Provided are a method and a device for enabling HARQ feedback information to be transmitted in response to the reception of a downlink data channel in the unlicensed band. The method may include: receiving downlink control information including resource allocation information for a downlink data channel (PDSCH) in an unlicensed band; receiving HARQ timing indication information for transmitting HARQ feedback information in the unlicensed band; and transmitting the HARQ feedback information in the unlicensed band according to the HARQ timing indication information.

12 Claims, 21 Drawing Sheets

(51) Int. Cl.
*H04W 72/0453* (2023.01)
*H04W 72/23* (2023.01)

(56) References Cited

U.S. PATENT DOCUMENTS

| | | |
|---|---|---|
| 2016/0301555 A1 | 10/2016 | Nory et al. |
| 2016/0301556 A1 | 10/2016 | Nory et al. |
| 2016/0302180 A1 | 10/2016 | Nory et al. |
| 2017/0141833 A1* | 5/2017 | Kim ............... H04L 5/0057 |
| 2017/0201308 A1* | 7/2017 | Park ............... H04W 16/14 |
| 2017/0202043 A1* | 7/2017 | Seo ............... H04W 16/14 |
| 2017/0207895 A1* | 7/2017 | Yang ............... H04W 72/23 |
| 2017/0215172 A1* | 7/2017 | Yang ............... H04L 27/2601 |
| 2017/0222857 A1 | 8/2017 | Nory et al. |
| 2017/0303306 A1* | 10/2017 | Lee ............... H04L 5/0087 |
| 2017/0310452 A1 | 10/2017 | Lee et al. |
| 2018/0054342 A1 | 2/2018 | Nory et al. |
| 2018/0124749 A1 | 5/2018 | Park et al. |
| 2019/0090218 A1 | 3/2019 | Noh et al. |
| 2019/0123861 A1 | 4/2019 | Liu et al. |
| 2019/0173650 A1 | 6/2019 | Park |
| 2019/0182085 A1 | 6/2019 | Nory et al. |
| 2019/0357190 A1 | 11/2019 | Park et al. |
| 2020/0274674 A1 | 8/2020 | Park |
| 2021/0127360 A1 | 4/2021 | Noh et al. |

FOREIGN PATENT DOCUMENTS

| | | |
|---|---|---|
| KR | 10-2013-0129018 A | 11/2013 |
| KR | 10-2015-0018016 A | 2/2015 |
| KR | 10-2017-0113473 A | 10/2017 |
| WO | 2016/048099 A2 | 3/2016 |
| WO | 2017/136056 A1 | 8/2017 |

OTHER PUBLICATIONS

China National Intellectual Property Administration, Office Action of corresponding CN Patent Application No. 201980032985.7, dated Dec. 20, 2022.

NTT DOCOMO, Inc., "DL/UL scheduling and HARQ management", R1-1718217, 3GPP TSG RAN WG1 Meeting 90bis, Prague, CZ, Oct. 9-13, 2017, pp. 1-14.

* cited by examiner

FIG. 13

PUCCH triggering DCI format

| ... | PUCCH resource indicator information | ... | HARQ timing indication information | ... |

FIG.14

PUCCH triggering DCI format

| ... | PUCCH resource indicator information | ... |

FIG.15

PUCCH triggering DCI format

| ... | HARQ timing indication information | ... |

*FIG.16*

DL assignment DCI format

| ... | PUCCH resource indicator information | ... | HARQ timing indication information | ... |

FIG.17

DL assignment DCI format

| ... | PUCCH allocation flag information | ... | PUCCH resource indicator information | ... |

METHOD AND DEVICE FOR TRANSMITTING HARQ FEEDBACK INFORMATION IN UNLICENSED BAND

CROSS REFERENCE TO RELATED APPLICATIONS

This application is a National Stage Patent Application of PCT International Patent Application No. PCT/KR2019/005760 (filed on May 14, 2019) under 35 U.S.C. § 371, which claims priority to Korean Patent Application Nos. 10-2018-0056288 (filed on May 17, 2018), 10-2018-0150160 (filed on Nov. 28, 2018), and 10-2019-0055567 (filed on May 13, 2019), the teachings of which are incorporated herein in their entireties by reference.

TECHNICAL FIELD

The present disclosure relates to methods and apparatuses for transmitting HARQ feedback information in an unlicensed band in a next-generation/5G radio access network (hereinafter, referred to as a new radio, "NR").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from each other (e.g., subcarrier spacing, subframe, Transmission Time Interval (TTI), etc.) as a method for efficiently satisfying each usage scenario requirement through a frequency band constituting a NR system.

To address these issues, there is a demand for methods and apparatuses for transmitting HARQ feedback information in response to the reception of a downlink data channel (PDSCH) using an unlicensed band in the NR.

DETAILED DESCRIPTION OF THE INVENTION

Technical Problem

In accordance with embodiments of the present disclosure, methods and apparatuses are provided for transmitting HARQ feedback information in response to the reception of a downlink data channel (PDSCH) in an unlicensed band.

Further, in accordance with embodiments of the present disclosure, methods and apparatuses are provided for transmitting an uplink control channel (PUCCH) including various uplink control information in an unlicensed band.

Technical Solution

In accordance with one aspect of the present disclosure, a method of a terminal (hereinafter, referred to as a user equipment ("UE")) is provided for transmitting HARQ feedback information in an unlicensed band. The method may include: receiving downlink control information including resource assignment information for a downlink data channel (PDSCH) in the unlicensed band, receiving HARQ timing indication information for transmission of the HARQ feedback information in the unlicensed band, and transmitting the HARQ feedback information in the unlicensed band according to the HARQ timing indication information.

In accordance with another aspect of the present disclosure, a method of a base station is provided for receiving HARQ feedback information in an unlicensed band. The method may include: transmitting downlink control information including resource assignment information for a downlink data channel (PDSCH) in the unlicensed band, transmitting HARQ timing indication information for transmission of the HARQ feedback information in the unlicensed band, and receiving the HARQ feedback information in the unlicensed band according to the HARQ timing indication information.

In accordance with further another aspect of the present disclosure, a user equipment ("UE") is provided that transmits HARQ feedback information in an unlicensed band. The user equipment may include: a receiver receiving downlink control information including resource assignment information for a downlink data channel (PDSCH) in the unlicensed band, and receiving HARQ timing indication information for transmission of the HARQ feedback information in the unlicensed band, and a transmitter transmitting the HARQ feedback information in the unlicensed band according to the HARQ timing indication information.

In accordance with yet another aspect of the present disclosure, a base station is provided that receives HARQ feedback information in an unlicensed band. The base station may include: a transmitter transmitting downlink control information including resource assignment information for a downlink data channel (PDSCH) in the unlicensed band, and transmitting HARQ timing indication information for transmission of the HARQ feedback information in the unlicensed band, and a receiver receiving the HARQ feedback information in the unlicensed band according to the HARQ timing indication information.

Effects of the Invention

In accordance with embodiments of the present disclosure, it is possible to provide methods and apparatuses for transmitting HARQ feedback information in an unlicensed band for enabling the HARQ feedback information to be transmitted in response to the reception of a downlink data channel in the unlicensed band.

Further, in accordance with embodiments of the present disclosure, it is possible to provide methods and apparatuses for transmitting an uplink control channel (PUCCH) including various uplink control information in an unlicensed band.

BRIEF DESCRIPTION OF THE DRAWINGS

The above and other aspects, features, and advantages of the present disclosure will be more apparent from the following detailed description taken in conjunction with the accompanying drawings, in which:

FIGS. 13 to 17 illustrate DCI formats in accordance with embodiments of the present disclosure;

BEST MODE FOR CARRYING OUT THE INVENTION

Figure 1:
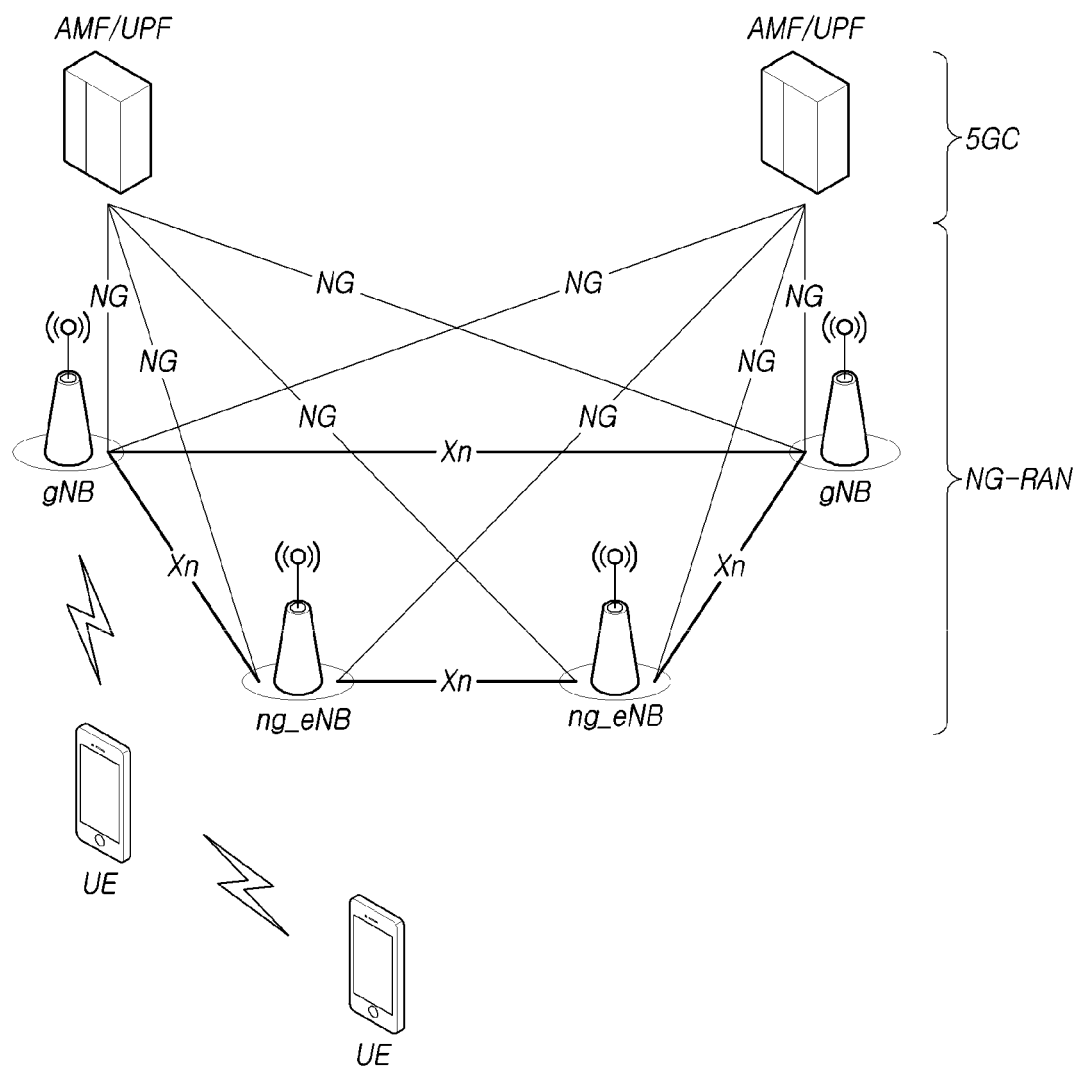
FIG. 1 schematically illustrates an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 schematically illustrates an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
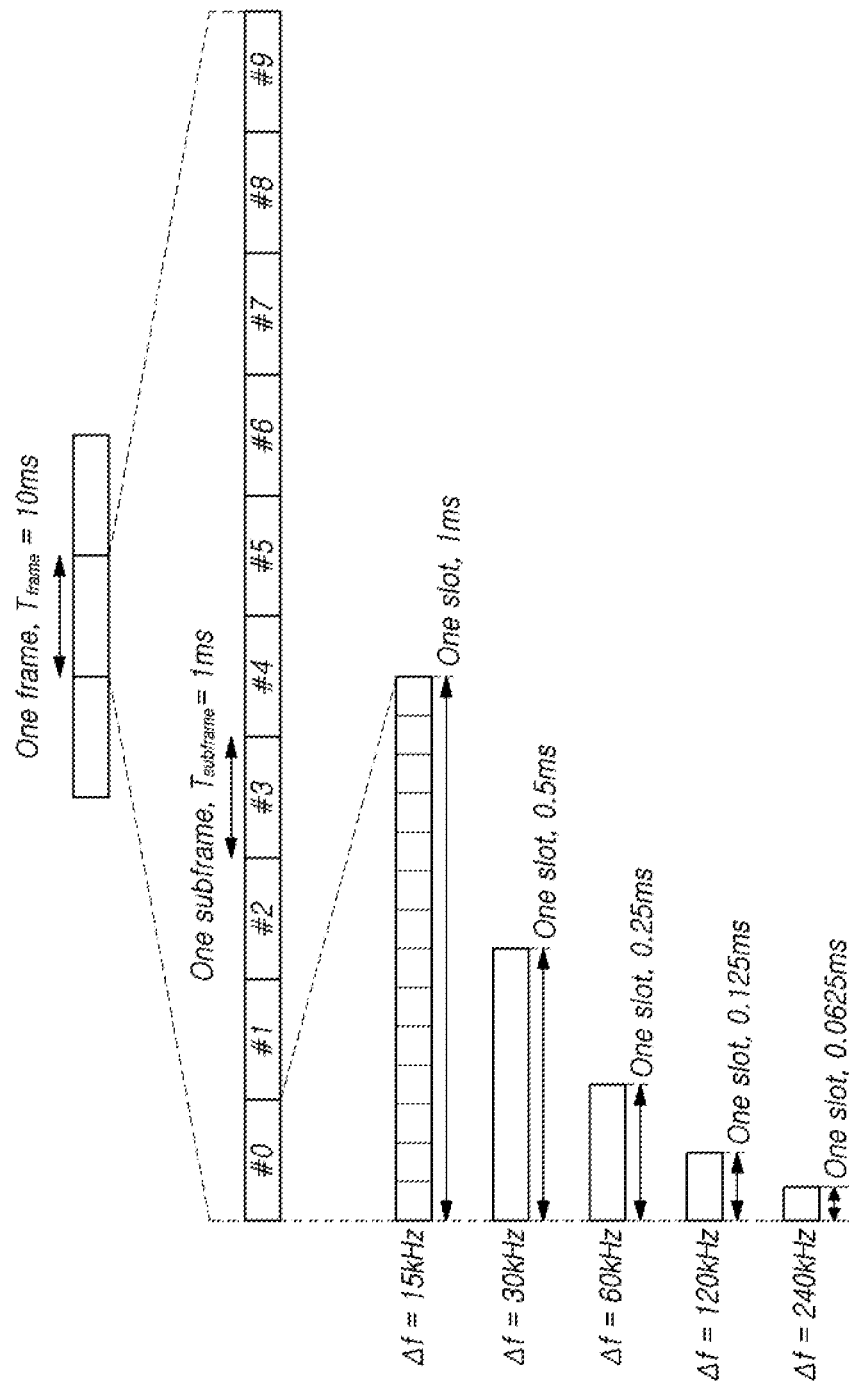
FIG. 2 schematically illustrates a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 illustrates a frame structure in an NR system. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
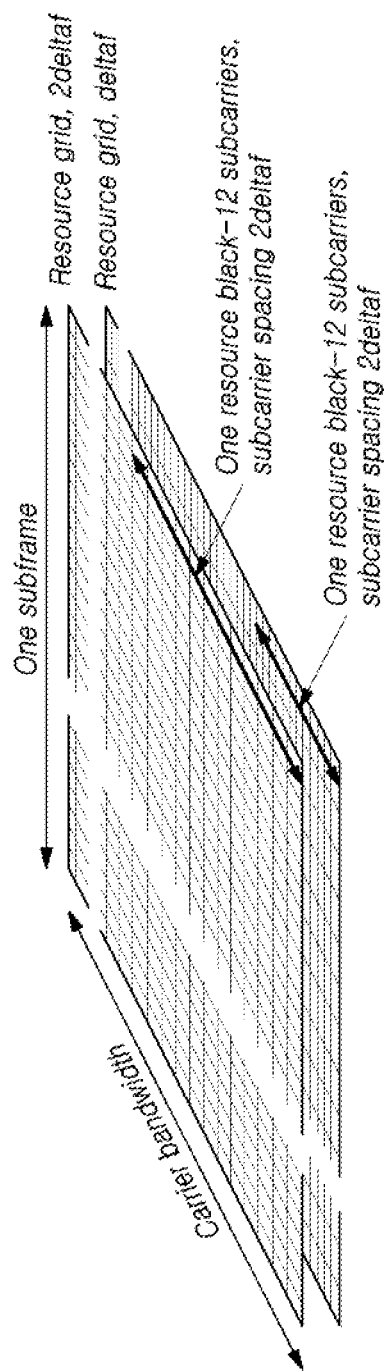
FIG. 3 illustrates resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
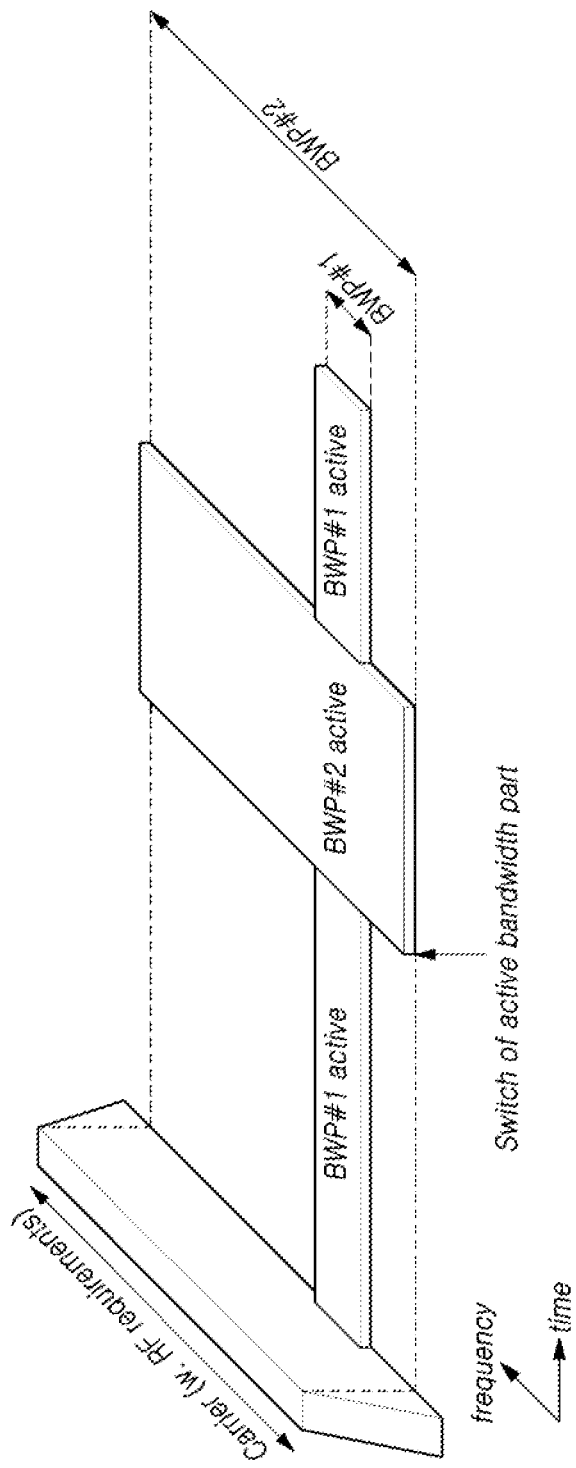
FIG. 4 illustrates bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
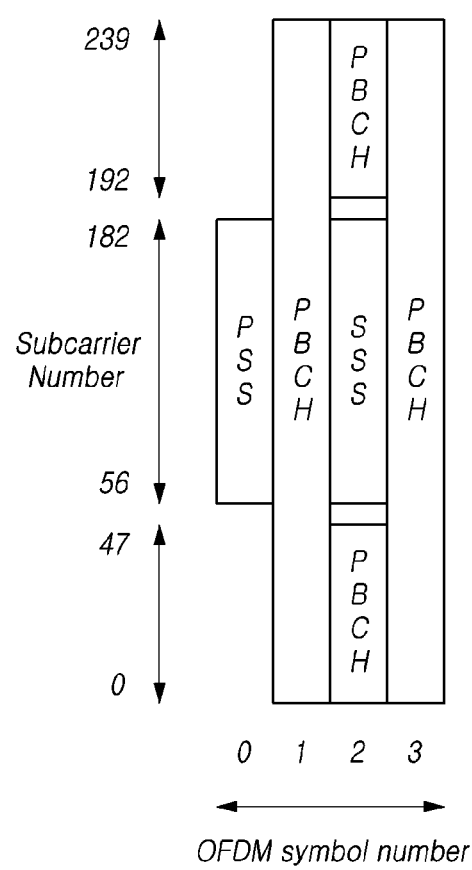
FIG. 5 illustrates an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
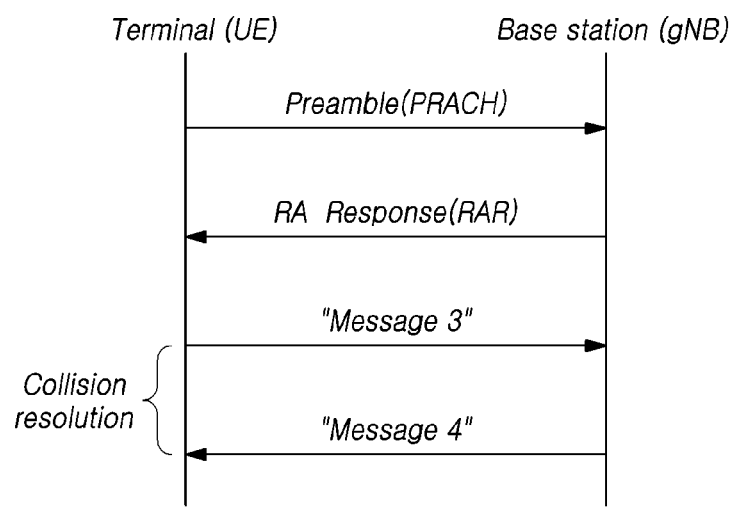
FIG. 6 is a signal diagram for explaining a random access procedure in a radio access technology in accordance with embodiments of the present disclosure.

FIG. 6 illustrates a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
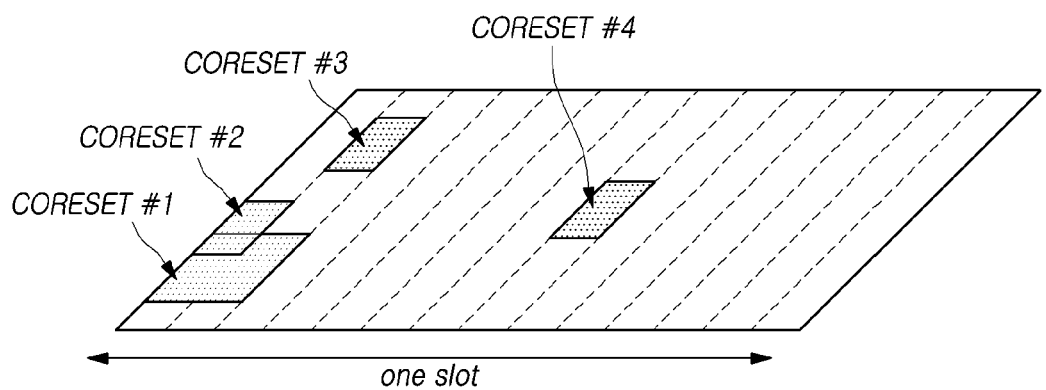
FIG. 7 illustrates CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

Recently, the 3GPP has approved the "Study on New Radio Access Technology", which is a study for research on next-generation/5G radio access technology. Based on the Study, in RAN WG1, discussions and designs have been in progress on frame structures, channel coding and modulation, waveforms, multiple access schemes, and the like for the NR. The NR is required to be designed not only to provide an improved data transmission rate but also to meet various QoS requirements for each detailed and specific usage scenario, compared to the LTE/LTE-Advanced.

An enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+an UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
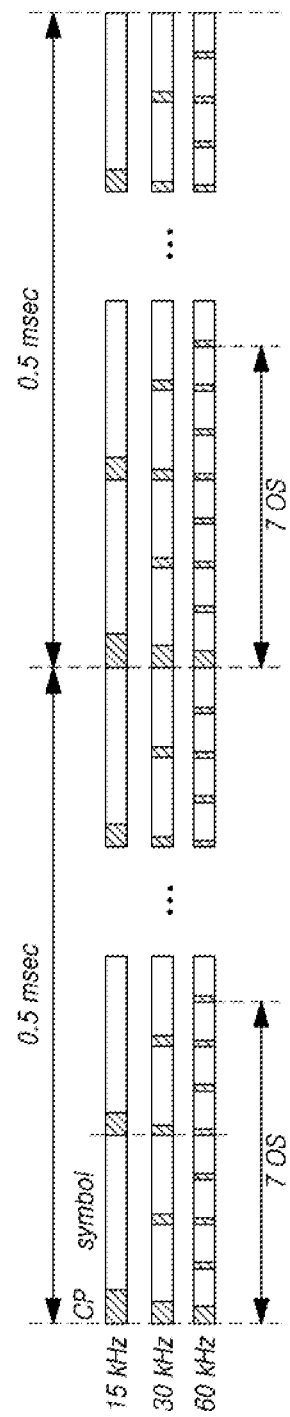
FIG. 8 illustrates an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

PDCCH

NR and LTE/LTE-A systems transmit and receive L1 control information, such as, DL assignment DL control information (DCI), UL grant DCI, and the like through a PDCCH. In NR, a control channel element (CCE) is defined as a resource unit for transmission of the PDCCH, and a control resource set (CORESET) that is a frequency/time resource for the PDCCH transmission may be configured for each UE. Further, each CORESET may include one or more search spaces including one or more PDCCH candidates for allowing a UE to monitor the PDCCH. In NR, discussions on descriptions defined in 3GPP TS 38.211 and TS 38.213 among specifications related to the PDCCH are omitted for convenience of description. However, it is understood that these descriptions may be included within the scope of the present disclosure without departing from the spirit and scope of the described embodiments.

Wider Bandwidth Operations

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 9:
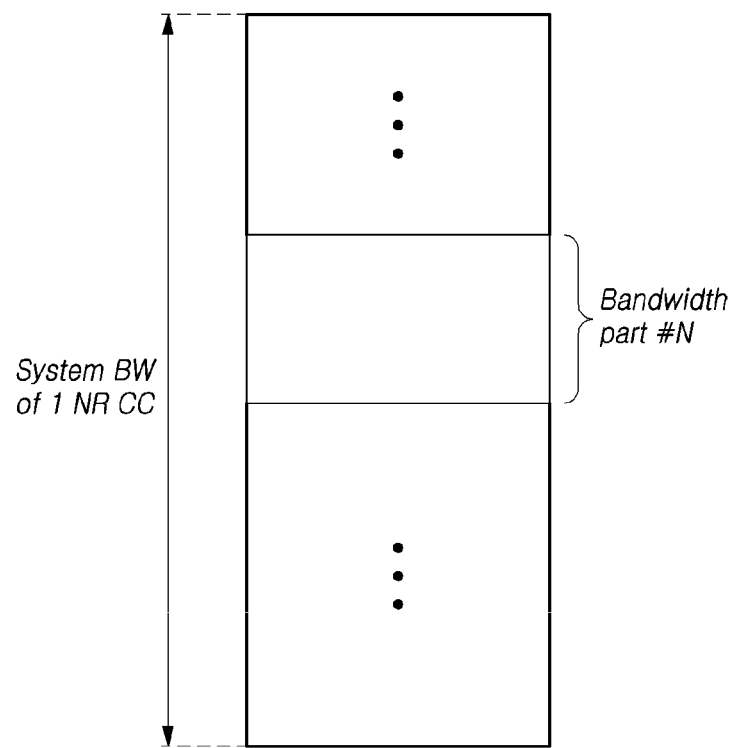
FIG. 9 schematically illustrates a bandwidth part to which embodiments of the present disclosure may be applied.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink ("DL") bandwidth part and one uplink ("UL") bandwidth part at a time.

NR-U

Unlike licensed bands, unlicensed bands are not allowed to be exclusively occupied by licensed operators and are thus available for any operator or individual to provide wireless communication services within regulations of each country. In order to provide NR services through an unlicensed band, it is necessary to solve a problem of coexistence with various short-range wireless communication protocols, such as WiFi, Bluetooth, near-field communication (NFC), and the like, which have been already provided over the unlicensed band, or a problem of coexistence between NR operators or LTE operators.

Thus, when NR services are provided through an unlicensed band, to avoid interferences or collisions between wireless communication services, it is necessary to support a radio channel access scheme based on Listen Before Talk (LBT) by which a power level of a radio channel or a carrier to be used before transmitting a radio signal is sensed and whether the radio channel or the carrier is available is determined. In this case, since when a specific radio channel or a carrier in the unlicensed band is being used by another wireless communication protocol or another operator, there is a possibility that an NR service over the corresponding band may not be timely provided, it is therefore difficult for a wireless communication service over the unlicensed band to ensure QoS required by a user, unlike a wireless communication service over a licensed band.

In particular, unlike LTE that has supported unlicensed spectrum only through Carrier Aggregation ("CA") with licensed spectrum, in the case of NR-U, as a deployment scenario of the NR over an unlicensed band, since a standalone NR-U cell or an NR-U cell based on Dual Connectivity ("DC") with an NR cell or an LTE cell over a licensed band is considered, it is necessary to design a data transmission/reception method for enabling the unlicensed band itself to satisfy minimum QoS.

To do this, a method of a UE is provided of transmitting an UL control channel in an NR-U cell in accordance with embodiments of the present disclosure.

Hereinafter, a method of transmitting HARQ feedback information in an unlicensed band will be described in detail with reference to accompanying drawings.

Figure 10:
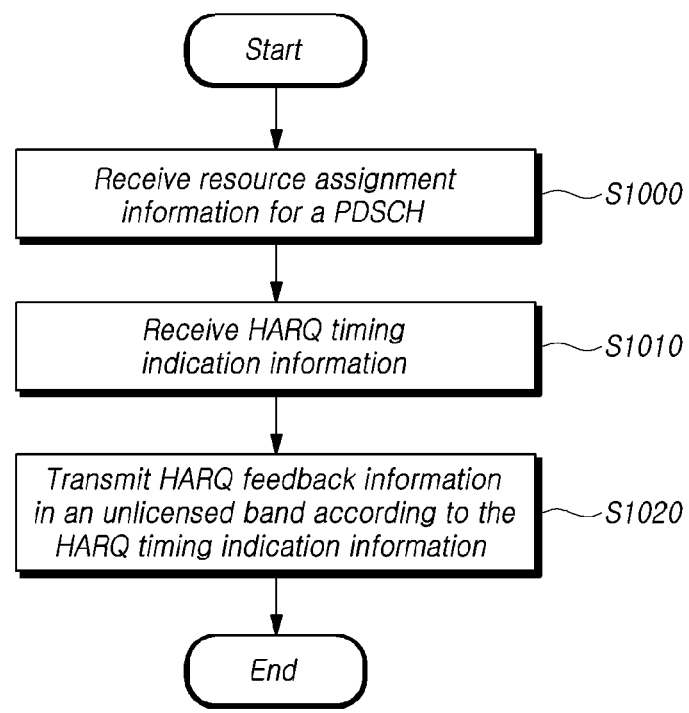
FIG. 10 is a flow diagram illustrating a procedure of a UE for transmitting HARQ feedback information in an unlicensed band in accordance with embodiments of the present disclosure.

FIG. 10 is a flow chart illustrating a procedure of a UE for performing Listen Before Talk (LBT) for wireless communications over an unlicensed band in accordance with embodiments of the present disclosure.

Referring to FIG. 10, a UE receives DL control information including resource assignment information for a DL data channel (PDSCH) in an unlicensed band, at step S1000.

The UE may receive the DL data channel from a base station based on the resource assignment information included in the DL control information. The UE may transmit HARQ ACK/NACK feedback information on whether the DL data channel is received to the base station.

Referring back to FIG. 10, the UE receives HARQ timing indication information for transmission of the HARQ feedback information in the unlicensed band, at step S1010.

In NR systems, the UE may receive resource assignment, and feedback timing (e.g., a K1 value) for an UL control channel (PUCCH) for HARQ feedback through DL assignment DCI. In another embodiment, the feedback timing (e.g., K1 value) may be set through RRC signaling. The UE may transmit HARQ feedback information according to whether the DL data channel is received based on the received resource assignment, and feedback timing (e.g., K1 value).

In this case, in the case of using unlicensed bands, when a corresponding unlicensed band in a slot according to a K1 value indicated by the base station is being occupied by another node, it may be difficult for the UE to perform a corresponding PUCCH transmission at a timing indicated by the base station. Accordingly, in one embodiment, the PUCCH transmission of the UE may be triggered by allowing the base station to perform the LBT and then inform the UE of the fact that access is available to the unlicensed band.

In one embodiment, PUCCH transmission triggering information defines a UE-group common DCI format for the PUCCH transmission triggering, and the PUCCH transmission triggering information may be transmitted through a UE-group common PDCCH. In another example, PUCCH transmission triggering information defines a UE-specific DCI format for the PUCCH transmission triggering, and such PUCCH transmission triggering information may be transmitted through a UE-specific PDCCH.

In one embodiment, a separately configured PUCCH triggering DCI format may include PUCCH resource assignment information, and PUCCH transmission timing information, a K3 value. Here, the K3 value may be set as a timing gap between a reception slot of the PUCCH triggering DCI format and a PUCCH transmission slot of the UE.

In another embodiment, the PUCCH triggering DCI format may include only PUCCH resource assignment information, and the K3 value may be set by the base station through UE-specific/cell-specific higher layer signaling. In another embodiment, the K3 value may be set as a predetermined value, such as a fixed value.

In another embodiment, the PUCCH triggering DCI format may be configured to include only the K3 value. In this case, PUCCH resource assignment information to be transmitted to each UE may be configured to be included in a DL assignment DCI format.

In case a PUCCH resource for HARQ feedback of a UE in response to a PDSCH is assigned through the separate PUCCH triggering DCI format different from the DL assignment DCI format, configuration or indication information for this may be signaled to the UE from a base station explicitly or implicitly.

In one embodiment, a base station may configure (e.g., determine) whether the PUCCH resource assignment is performed through the PUCCH triggering DCI format through UE-specific or cell-specific RRC signaling. In this case, based on the configuration information on whether the PUCCH resource assignment is performed for HARQ feedback through the separate PUCCH triggering DCI format, a UE is able to determine whether to receive PUCCH resource assignment information through a PUCCH resource indicator included in the DL assignment DCI format or whether to receive the PUCCH resource assignment information through the separate PUCCH triggering DCI format for the PUCCH resource assignment.

In another embodiment, the configuration information may be indicated through a DL assignment DCI format including PDSCH resource assignment information, DCI format 1_0 or DCI format 1_1. That is, when resource assignment for a PDSCH is performed, postponement indication information for indicating whether the transmission of HARQ feedback information is required to be postponed may be included in the DL assignment DCI format. This may mean that information on whether the PUCCH resource assignment information is performed through the PUCCH resource indicator of the DL assignment DCI format, or performed by being postponed through the separate PUCCH triggering DCI format subsequently transmitted is signaled through the DL assignment DCI format.

In this case, in one embodiment, the DL assignment DCI format may include a separate information region for indicating the postponement indication information, for example, a PUCCH allocation flag information region, or the like. In another example, the DL assignment DCI format may be configured to indicate this by using a typical information region, for example, a PUCCH resource indicator information region.

As another example, the corresponding information may be implicitly signaled. In one embodiment for this, the postponement indication information may be indicated according to a K1 value indicated through the DL assignment DCI format. That is, when the K1 value is greater than or equal to a specific threshold, PUCCH resource assignment may be indicated through the separate PUCCH triggering DCI format. In another example, when the K1 value is less than the specific threshold, the PUCCH resource assignment may be performed through the PUCCH resource indicator of the DL assignment DCI format. In this case, the specific threshold may be fixed as a specific value or set by a base station through cell-specific/UE-specific RRC signaling.

Referring back to FIG. 10, the UE transmits HARQ feedback information in the unlicensed band according to the HARQ timing indication information, at step S1020.

When the PUCCH resource assignment is performed through the PUCCH resource indicator of the DL assignment DCI format, the UE may transmit the HARQ feedback information according to the received resource assignment information.

Unlike this, when postponement for the transmission of the HARQ feedback information is indicated, that is, when the PUCCH resource assignment is indicated through the PUCCH triggering DCI format, the UE may postpone the transmission of the HARQ feedback information until receiving resource assignment information and timing information for transmitting the HARQ feedback information from the base station. The UE may receive the PUCCH triggering DCI format after receiving the DL assignment DCI format. The UE may transmit the HARQ feedback information according to resource assignment information and timing information for an UL control channel included in the PUCCH triggering DCI format. In this case, when the UE receives the PUCCH triggering DCI format, the UE may transmit all pending HARQ ACK feedback information through the corresponding PUCCH.

According to the embodiments described above, it is possible to provide methods and apparatuses for transmitting HARQ feedback information in an unlicensed band for enabling the HARQ feedback information to be transmitted in response to the reception of a DL data channel in the unlicensed band.

Hereinbefore, the embodiments have been described based on a situation transmitting HARQ feedback information as UL control information (UCI); however, embodiments of the present disclosure are not limited thereto. For example, when other UCI such as CQI/CSI reporting or SR other than HARQ feedback is present before a PUCCH triggering DCI format is received, the UE may transmit all pending UCI through the corresponding PUCCH in accordance with another embodiment of the present disclosure.

In this case, a base station may set a maximum payload size or a maximum codebook size transmitted through a PUCCH. Further, the set maximum payload size or maximum codebook size may be transmitted to the UE through UE-specific/cell-specific higher layer signaling, MAC CE signaling, or L1 control signaling. In this case, when the UE performs corresponding PUCCH transmission according to the reception of the PUCCH triggering DCI format, when a payload size of pending UCI exceeds the maximum payload size, specific UCI may be configured to be dropped.

In one embodiment, a priority rule for the UCI dropping may be set. For example, a priority for each UCI type may be set. As one example of defining a priority for each UCI type, priorities may be defined in order of SR>HARQ ACK feedback>CQI/CSI reporting. As another example, priorities may be defined in the order of SR=HARQ ACK feedback>CQI/CSI reporting. However, this is an example; thus, embodiments of the present disclosure are not limited thereto. All embodiments setting a priority for each UCI type in addition these examples are included within the scope of the present disclosure. Further, when dropping occurs for any of UCIs of an equal priority or an equal type, the dropping may be performed in order, or in reverse order, of occurrence of the UCIs.

According to the embodiments described above, it is possible to provide methods and apparatuses for transmitting an uplink control channel (PUCCH) including various uplink control information in an unlicensed band.

Figure 11:
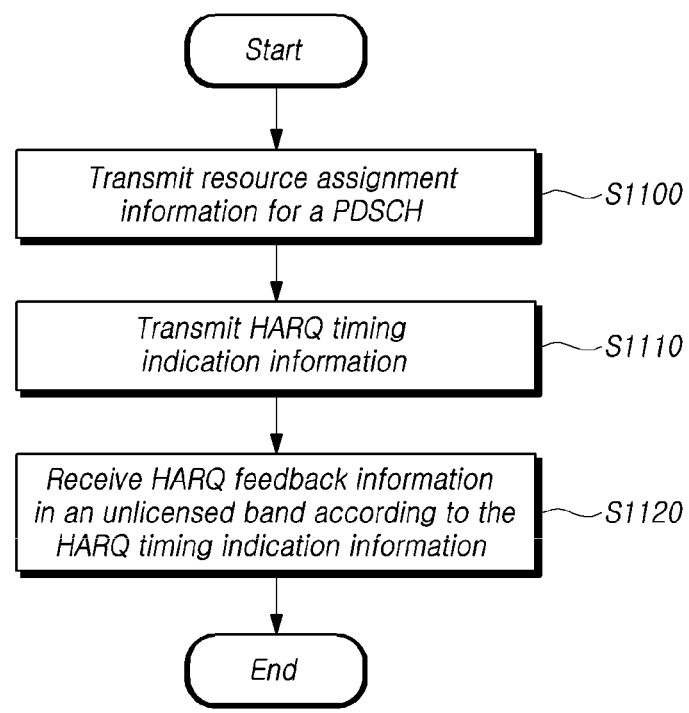
FIG. 11 is a flow diagram illustrating a procedure of a base station for receiving HARQ feedback information in an unlicensed band in accordance with embodiments of the present disclosure.

FIG. 11 is a flowchart illustrating a procedure of a base station for receiving HARQ feedback information in an unlicensed band in accordance with embodiments of the present disclosure.

Referring to FIG. 11, a base station transmits DL control information including resource assignment information for a DL data channel (PDSCH) in an unlicensed band, at step S1100.

The base station may transmit the DL data channel to a UE based on the resource assignment information included in the DL control information. The base station may receive HARQ ACK/NACK feedback information on whether the DL data channel is received from the UE.

Referring back to FIG. 11, the base station transmits HARQ timing indication information for receiving the HARQ feedback information in the unlicensed band, at step S1110.

In NR systems, the base station may transmit resource assignment and feedback timing (e.g., K1 value) for an UL control channel (PUCCH) for HARQ feedback through DL assignment DCI. In another embodiment, the feedback timing (e.g., K1 value) may be set through RRC signaling. The base station may receive HARQ feedback information according to whether the DL data channel is received based on the received resource assignment and feedback timing (e.g., K1 value).

In this case, in the case of using unlicensed bands, when a corresponding unlicensed band in a slot according to the K1 value indicated by the base station is occupied by another node, it may be difficult for the UE to perform a corresponding PUCCH transmission at a timing indicated by the base station. Accordingly, in one embodiment, the PUCCH transmission of the UE may be triggered by allowing the base station to perform the LBT and then inform the UE of the fact that access is available to the unlicensed band.

In one embodiment, PUCCH transmission triggering information defines a UE-group common DCI format for the PUCCH transmission triggering, and the PUCCH transmission triggering information may be transmitted through a UE-group common PDCCH. In another example, PUCCH transmission triggering information defines a UE-specific DCI format for the PUCCH transmission triggering, and such PUCCH transmission triggering information may be transmitted through a UE-specific PDCCH.

In one embodiment, a separately configured PUCCH triggering DCI format may include PUCCH resource assignment information and PUCCH transmission timing information (e.g., K3 value). Here, the K3 value may be set as a timing gap between a reception slot of the PUCCH triggering DCI format and a PUCCH transmission slot of the UE.

In another embodiment, the PUCCH triggering DCI format may include only PUCCH resource assignment information, and the K3 value may be set by the base station through UE-specific/cell-specific higher layer signaling. In another embodiment, the K3 value may be set as a predetermined value, such as a fixed value.

In another embodiment, the PUCCH triggering DCI format may be configured to include only the K3 value. In this case, PUCCH resource assignment information to be transmitted to each UE may be configured to be included in a DL assignment DCI format.

In case PUCCH resource assignment for HARQ feedback of a UE in response to a PDSCH is performed through the separate PUCCH triggering DCI format different from the DL assignment DCI format, configuration or indication information for this may be signaled to the UE from a base station explicitly or implicitly.

In one embodiment, a base station may configure (e.g., determine, indicate, instruct, inform) whether PUCCH resource assignment is performed through the PUCCH triggering DCI format through UE-specific or cell-specific RRC signaling. In this case, based on the configuration information on whether the PUCCH resource assignment is performed for HARQ feedback through the separate PUCCH triggering DCI format, a UE may determine whether to receive PUCCH resource assignment information through a PUCCH resource indicator included in the DL assignment DCI format or whether to receive the PUCCH resource assignment information through the separate PUCCH triggering DCI format for the PUCCH resource assignment.

In another embodiment, the configuration information may be indicated through a DL assignment DCI format including PDSCH resource assignment information, DCI format 1_0 or DCI format 1_1. That is, when PDSCH resource assignment is performed, postponement indication information for indicating whether the transmission of HARQ feedback information is required to be postponed may be included in the DL assignment DCI format. This may mean that information on whether the PUCCH resource assignment information is performed through the PUCCH resource indicator of the DL assignment DCI format, or performed by being postponed through the separate PUCCH triggering DCI format subsequently transmitted is signaled through the DL assignment DCI format.

In this case, in one embodiment, the DL assignment DCI format may include a separate information region for indicating the postponement indication information, for example, a PUCCH allocation flag information region, or the like. In another embodiment, the DL assignment DCI format may be configured to indicate this by using a typical information region, for example, a PUCCH resource indicator information region.

In another embodiment, the corresponding information may be implicitly signaled. In one embodiment for this, the postponement indication information may be indicated according to a K1 value indicated through the DL assignment DCI format. That is, when the K1 value is greater than or equal to a specific threshold, a PUCCH resource assignment may be indicated through the separate PUCCH triggering DCI format. In another embodiment, when the K1 value is less than the specific threshold, the PUCCH resource assignment may be performed through the PUCCH resource indicator of the DL assignment DCI format. In this case, the specific threshold may be fixed as a specific value, or set by a base station through cell-specific/UE-specific RRC signaling.

Referring back to FIG. 11, the base station receives HARQ feedback information in the unlicensed band according to the HARQ timing indication information, at step S1120.

When the PUCCH resource assignment is performed through the PUCCH resource indicator of the DL assignment DCI format, the base station may receive the HARQ feedback information according to the received resource assignment information.

Unlike this, when postponement for the transmission of the HARQ feedback information is indicated, that is, when the PUCCH resource assignment is indicated through the PUCCH triggering DCI format, the base station may enable the transmission of the HARQ feedback information by the UE to be postponed until transmitting resource assignment information and timing information for transmitting the HARQ feedback information. The base station may transmit the PUCCH triggering DCI format after transmitting the DL assignment DCI format. The base station may receive the HARQ feedback information according to resource assignment information and timing information for an UL control channel included in the PUCCH triggering DCI format. In this case, the base station may receive all pending HARQ ACK feedback information through the corresponding PUCCH when the PUCCH triggering DCI format is received.

According to the embodiments described above, it is possible to provide methods and apparatuses for transmitting HARQ feedback information in an unlicensed band for enabling the HARQ feedback information to be transmitted in response to the reception of a DL data channel in the unlicensed band.

Hereinafter, embodiments of transmitting HARQ feedback information in an unlicensed band in the NR will be described in detail with reference to accompanying drawings.

As described above, in order for any node to transmit a radio signal over an unlicensed band, it is necessary to perform the LBT process for identifying whether a corresponding radio channel is occupied by another node.

Thus, in order for an NR-U cell in an unlicensed band configured by an NR base station to perform a PDSCH transmission for a UE, the base station is needed to perform the LBT for the unlicensed band. When it is determined that the radio channel of the unlicensed band is not occupied by another by performing the LBT, the base station may transmit a PDCCH and an associated PDSCH to the UE.

Likewise, in order for a UE to transmit an UL signal over an unlicensed band, it is necessary to perform the LBT for the unlicensed band prior to transmitting the UL signal.

In one embodiment, in the NR, for HARQ ACK/NACK feedback timing in response to a PDSCH reception of a UE, a base station may configure it through RRC signaling or indicate it to the UE through DL assignment DCI. In this case, in the case of the NR-U cell for the unlicensed band described above, it may not be possible to perform a PUCCH transmission including HARQ ACK/NACK feedback information at a time indicated by the base station according to a result of the LBT performed by the UE. That is, when an LBT failure occurs according to the result of the LBT, in which a corresponding radio channel has been occupied by another node, the UE may not be able to transmit the HARQ ACK/NACK feedback information in response to a PDSCH reception at a time indicated by the base station. This may lead to HARQ performance in the NR-U cell being severely degraded.

Figure 12:
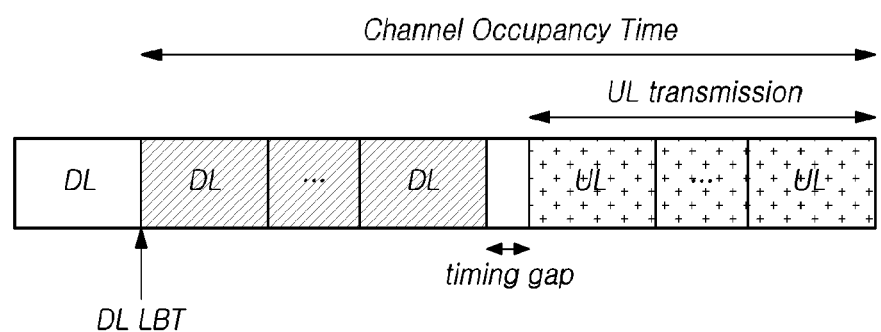
FIG. 12 illustrates the implementation of an LBT scheme for wireless communications over an unlicensed band in accordance with embodiments of the present disclosure.

FIG. 12 illustrates the implementation of an LBT scheme for wireless communications over an unlicensed band in accordance with embodiments of the present disclosure.

In one embodiment, when assigning a PUCCH or PUSCH transmission resource for a UE, a base station may indicate whether the LBT is required to be performed in the UE at a time of transmitting the PUCCH or the PUSCH. The UE may transmit UL control information (UCI) such as HARQ ACK/NACK feedback information or CQI/CSI reporting information to the base station through the PUCCH. In this regard, in NR, a time-domain resource and a frequency-domain resource that are PUCCH resources for transmitting HARQ feedback may be indicated by a base station through DL assignment DCI. In another embodiment, PUCCH resources for transmitting HARQ feedback may be semi-statically configured through RRC signaling. In particular, in the case of the time-domain resource, a timing gap (e.g., K1 value) between a PDSCH reception slot and an associated HARQ feedback information transmission slot may be transmitted to a UE through DL assignment DCI or RRC signaling.

Likewise, a PUCCH resource for CQI/CSI reporting may be assigned through the RRC signaling and the DL assignment DCI.

In FIG. 12, hatched blocks represent that a base station succeeds in performing LBT for a DL transmission (DL LBT), and thereafter, the DL transmission is performed through an unlicensed band. In one embodiment, the DL transmission may be a transmission of a DL channel or signal for indicating an UL transmission. For example, the DL transmission may include a PDSCH transmission and a PUCCH for an associated HARQ feedback, DCI requiring CQI/CSI reporting and a PUCCH for associated reporting, or DCI transmitting scheduling information on a PUSCH and an associated PUSCH, etc. In this case, there occurs a timing gap between the DL transmission and the UL transmission.

For example, when a DL signal or channel associated with a DL transmission indicates a PUCCH transmission in an NR-U cell configured in an unlicensed band, a UE is required to preferentially perform LBT for the PUCCH transmission according to regulations on unlicensed spectrum. According to a result of the LBT, it is determined whether the PUCCH transmission at an indicated time is available. If it is determined that a corresponding radio channel has been occupied by another node based on the result of the LBT, that is, when an LBT failure occurs, there is a possibility that the UE is not able to perform the PUCCH transmission at the indicated time.

However, when a channel occupancy time (COT) of a base station includes a DL assignment DCI transmission slot including PUCCH resource assignment information and PUCCH transmission indication information or a PDSCH transmission slot according to DL assignment DCI and an associated PUSCH transmission slot, there is a possibility that the UE may perform the PUCCH transmission without performing the LBT. This is because the corresponding unlicensed band has already been occupied by the base station for the DL transmission for the UE; therefore, it has not been occupied by another node. That is, there is a possibility that the UE may perform HARQ feedback transmission through the PUCCH without performing the LBT, according to the setting of the COT of the base station and the K1 value.

Likewise, in case CSI/CQI reporting through a PUCCH is indicated through DL assignment DCI, when M denotes a timing gap value between a slot on which the DL assignment DCI is transmitted and a slot on which a PUCCH transmission including associated CQI/CSI reporting information is performed, there is a possibility that a UE may perform CSI/CQI reporting through the PUCCH without performing the LBT, according to the corresponding timing gap value, M, and the COT of the base station.

Further, in a similar way to that of the PUCCH, for a PUSCH transmission of a UE, a timing gap information, a K2 value, between UL grant DCI transmitted by the base station and a slot on which an associated PUSCH transmission is performed may be semi-statically set through RRC signaling by the base station or dynamically set through the UL grant DCI. In even this case, when the COT of the base station includes an UL grant DCI transmission slot including corresponding PUSCH transmission resource assignment information and an associated PUSCH transmission slot, there is a possibility that a UE may perform the PUSCH transmission without performing the LBT.

In this regard, in accordance with embodiments of the present disclosure, the base station may determine an LBT scheme to be performed when a UE transmits a PUCCH or a PUSCH and indicate the determined LBT scheme to the UE. In one embodiment, the LBT scheme may include a plurality of schemes based on at least one of whether the LBT is required to be performed, whether random-back-off is required to be performed, and a random-back-off time. Herein, a scheme of performing the LBT may be referred to as "LBT scheme"; however, embodiments of the present disclosure are not limited to such a specific term. For example, the scheme of performing the LBT may be variously referred to as an LBT category, or the like.

In one embodiment, the LBT scheme may include i) a first LBT scheme in which the LBT is not performed, ii) a second LBT scheme in which the random-back-off is not performed while the LBT is performed, iii) a third LBT scheme in which a random-back-off time interval is fixed while the random-back-off is performed, and iv) a fourth LBT scheme in which the random-back-off time interval is variable while the random-back-off is performed.

In one embodiment, a base station may directly indicate, to a UE, whether the LBT is required to be performed for an UL transmission of the UE through L1 control signaling. Specifically, an LBT indication information region may be included in a DL assignment DCI format for transmitting PDSCH scheduling control information.

In one embodiment, the LBT indication information may be indication information of 1 bit. In this case, when a UE transmits a PUCCH corresponding to the DL assignment DCI format, whether the UE is required to perform the LBT may be defined to be determined according to a value (0, 1) of the indication information bit. That is, in this case, the bit values may mean distinguishing the first LBT scheme from the remaining LBT schemes, among the LBT schemes described above.

In another embodiment, the LBT indication information may be indication information of 2 bits. In this case, when a UE transmits a PUCCH corresponding to the DL assignment DCI format, an LBT scheme of the UE for performing the LBT may be determined according to a value (00, 01, 10, 11) of the indication information bit. That is, in this case, the bit values may mean distinguishing the first to fourth LBT schemes among the LBT schemes described above.

In this case, the PUCCH transmission corresponding to the DL assignment DCI format by the UE may be a PUCCH transmission for a HARQ feedback information transmission of the UE in response to a PDSCH reception of the UE based on the DL assignment DCI format. In another embodiment, when CQI/CSI reporting is triggered by the DL assignment DCI format, the PUCCH transmission corresponding to the DL assignment DCI format by the UE may be an associated PUCCH transmission for the CQI/CSI reporting.

Likewise, the LBT indication information region may be included in an UL grant DCI format for transmitting PUSCH scheduling control information.

For example, the LBT indication information may be indication information of 1 bit. In this case, when a UE transmits a PUSCH corresponding to the UL grant DCI format, whether the UE is required to perform the LBT may be determined according to a value (0, 1) of the indication information bit. That is, in this case, the bit values may mean distinguishing the first LBT scheme from the remaining LBT schemes, among the LBT schemes described above.

In another embodiment, the LBT indication information may be indication information of 2 bits. In this case, when a UE transmits a PUSCH corresponding to the UL grant DCI format, an LBT scheme of the UE for performing the LBT may be determined according to a value (00, 01, 10, 11) of the indication information bit. That is, in this case, the bit values may mean distinguishing the first to fourth LBT schemes among the LBT schemes described above.

In this case, the PUSCH transmission corresponding to the DL grant DCI format by the UE may be a PUSCH transmission for an UL data transmission of the UE, or a PUSCH transmission for a UCI transmission of the UE.

In another embodiment of defining whether the LBT is required to be performed or which LBT scheme is used for an UL transmission of a UE, as shown in FIG. 12, whether the LBT is required to be performed may be determined by a timing gap value between a DL transmission to which the UL transmission is indicated and the associated UL transmission.

In one embodiment, when the timing gap value is smaller than a threshold value of each of the DL transmission and the UL transmission, a UE may enable an indicated PUCCH or PUSCH transmission to be performed without performing the LBT. In another example, when the timing gap value is larger than the threshold value, the UE may enable a corresponding PUCCH or PUSCH transmission to be performed after performing the LBT.

In one embodiment, the threshold value may be i) determined by a COT value in a corresponding NR-U, ii) configured by a base station through cell-specific RRC signaling or UE-specific RRC signaling, or iii) configured by the base station through cell-specific RRC signaling or UE-specific RRC signaling irrespective of the COT.

Additionally, the threshold value may be defined as a single threshold value for each UL transmission case or be defined as different threshold values and then configured (e.g., instructed, indicated, informed) by a base station through cell-specific RRC signaling or UE-specific RRC signaling.

Accordingly, an LBT scheme to be performed for transmitting an UL signal in an unlicensed band may be determined, and the UL signal in the unlicensed band can be transmitted according to the determined LBT scheme.

In accordance with embodiments of the present disclosure, HARQ ACK/NACK feedback methods of a UE for an NR-U cell are provided taking account of a situation in which an unlicensed band may be occupied by another node at an indicated time, as described above. However, embodiments are not limited thereto. For example, embodiments of the present disclosure may be substantially equally applied to methods of transmitting an UL control channel (PUCCH) including other types of UCI, such as SR or CSI/CQI feedback, or the like, in addition to the HARQ ACK feedback.

Embodiment 1. Directly Indicating a HARQ ACK/NACK Feedback Slot Through Separate DCI In one embodiment, a DL control information (DCI) format separately from DL data channel (PDSCH) assignment through DL assignment DCI may be defined for indicating a PUCCH transmission including HARQ feedback information of a UE in response to the corresponding PDSCH. Through this, a base station may trigger a PUCCH transmission including HARQ feedback information for a UE.

In typical NR systems, resource assignment, and a feedback timing, a K1 value, for an UL control channel (PUCCH) for performing HARQ feedback are indicated through DL assignment DCI. Alternatively, the K1 value is set through RRC signaling. However, in the case an NR-U cell configured in an unlicensed band, it may be difficult to ensure a PUCCH transmission of a UE in a slot according to an indicated K1 value. Accordingly, in accordance with embodiments of the present disclosure, the PUCCH transmission of the UE may be triggered by allowing a base station to check accessibility for a corresponding radio channel through the LBT and then inform the UE of the fact that access is available to the channel.

PUCCH transmission triggering information may be transmitted through a PDCCH. In one embodiment, the PUCCH transmission triggering information defining a UE-group common DCI format for the corresponding PUCCH transmission triggering may be transmitted through a UE-group common PDCCH (i.e. CSS). In another embodiment, the PUCCH transmission triggering information defining a UE-specific DCI format for the PUCCH transmission triggering may be transmitted through a UE-specific PDCCH (i.e. USS).

In this case, as illustrated in FIG. 13, in one embodiment, a PUCCH triggering DCI format may include PUCCH resource assignment information, and PUCCH transmission timing information, a K3 value. Here, the K3 value may be defined as a timing gap between a reception slot of the PUCCH triggering DCI format and an associated PUCCH transmission slot of a UE.

In another embodiment, as illustrated in FIG. 14, a PUCCH triggering DCI format may be defined to include only PUCCH resource assignment information, and the K3 value may be defined to be set by a base station through UE-specific/cell-specific higher layer signaling or fixed as a predefined value.

In another embodiment, as illustrated in FIG. 15, a PUCCH triggering DCI format may be defined to include only the K3 value, and PUCCH resource assignment information for a transmission of each UE may be defined to be included in the DL assignment DCI format.

In case a PUCCH resource is assigned for HARQ feedback of a UE in response to a PDSCH through the separate PUCCH triggering DCI format different from the DL assignment DCI format, configuration or indication information for this may be signaled to the UE from a base station explicitly or implicitly.

In one embodiment, the base station may configure (e.g., determine, instruct, inform, indicate) whether PUCCH resource assignment is performed through the PUCCH triggering DCI format through UE-specific or cell-specific RRC signaling. In this case, as illustrated in FIG. 16, the UE may determine, through the configuration information, whether to receive PUCCH resource assignment information through a PUCCH resource indicator included in the DL assignment DCI format, or whether to receive the PUCCH resource assignment information through the reception of the PUCCH triggering DCI format for separate PUCCH resource assignment.

In another embodiment, the configuration information may be indicated through a DL assignment DCI format including PDSCH resource assignment information, DCI format 1_0 or DCI format 1_1. That is, when PDSCH resource assignment is performed, information on whether PUCCH resource assignment information is configured or indicated through the PUCCH resource indicator of the DL assignment DCI format, or whether the PUCCH resource assignment information is configured or indicated through the PUCCH triggering DCI format that is a separate DCI format subsequently transmitted may be signaled through the DL assignment DCI format. In this case, as illustrated in FIG. 17, for indicating this, the DL assignment DCI format may include a separate information region, for example, a PUCCH allocation flag information region, or the like. In another embodiment, the DL assignment DCI format may be defined to indicate this by using a typical information region, for example, a PUCCH resource indicator information region. Locations of respective information items in DCI formats illustrated in FIGS. 13 to 17 are represented as examples; therefore, embodiments of the present disclosure are not limited thereto.

In another embodiment, the corresponding information may be implicitly signaled. For example, the corresponding information may be indicated according to a K1 value indicated through the DL assignment DCI format. That is, when the K1 value is greater than or equal to a specific threshold, corresponding PUCCH resource assignment may be indicated through the separate DCI format. As another example, when the K1 value is less than the specific threshold, the PUCCH resource assignment may be performed through the PUCCH resource indicator of the DL assignment DCI format. In this case, the specific threshold may be fixed as a specific value, or set by a base station through cell-specific/UE-specific RRC signaling.

When a UE receives the PUCCH triggering DCI format, the UE may transmit all pending HARQ ACK feedback information through a corresponding PUCCH accordingly.

According to the embodiments described above, it is possible to provide methods and apparatuses for transmitting HARQ feedback information in an unlicensed band for enabling the HARQ feedback information to be transmitted in response to the reception of a DL data channel in the unlicensed band.

In accordance with embodiments of the present disclosure, when other UCI such as CQI/CSI reporting or SR other than HARQ feedback is present until before the UE receives the PUCCH triggering DCI format, the UE may transmit all pending UCI through the PUCCH.

In this case, a base station may set a maximum payload size or a maximum codebook size that may be transmitted through any PUCCH, and the maximum payload size of the maximum codebook size may be transmitted to a UE through UE-specific/cell-specific higher layer signaling, MAC CE signaling, or L1 control signaling. In this case, when the UE performs corresponding PUCCH transmission according to the reception of the PUCCH triggering DCI format, if a payload size of pending UCI exceeds the maximum payload size, specific UCI may be defined to be dropped.

In this case, a priority rule for the UCI dropping may be defined, and as an example for this, a priority for each UCI type may be defined. As one example of defining the priority for each UCI type, priorities may be defined in order of SR>HARQ ACK feedback>CQI/CSI reporting. As another example, priorities may be defined in the order of SR=HARQ ACK feedback>CQI/CSI reporting. However, this is an example; thus, embodiments of the present disclosure are not limited thereto. All embodiments setting a priority for each UCI type in addition these examples can be included within the scope of the present disclosure. Further, when dropping occurs for any of UCIs of an equal priority or an equal type, the dropping may be performed in order, or in reverse order, of occurrence of the UCIs.

According to the embodiments described above, it is possible to provide methods and apparatuses for transmitting an uplink control channel (PUCCH) including various uplink control information in an unlicensed band.

Embodiment 2. Configuring a HARQ Feedback Window

In one embodiment, the HARQ feedback window may be configured with consecutive HARQ feedback windows.

In order to secure reliability for HARQ ACK/NACK feedback transmission of a UE in an NR-U cell, a plurality of PUCCH resource sets may be defined to be assigned for transmitting HARQ feedback in response to one PDSCH reception. Each PUCCH resource included in the plurality of PUCCH resource sets in response to one PDSCH reception is referred to as a PUCCH opportunity herein. However, this is an example; thus, embodiments of the present disclosure are not limited thereto.

Figure 18:
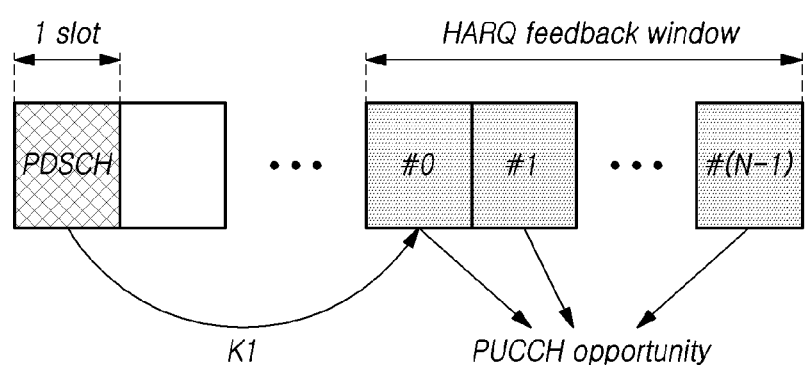
FIGS. 18 and 19 illustrate HARQ feedback windows in accordance with embodiments of the present disclosure.

Specifically, a plurality of PUCCH opportunities for HARQ feedback of a UE in response to one PDSCH reception may be configured in the time domain. Referring to FIG. 18, a HARQ feedback window may be made up of consecutive slots. Accordingly, a base station may transmit information on a start slot of the HARQ feedback window, an offset value, and a corresponding window size to a UE. Here, the offset value means a timing gap (e.g., K1 value) between a PDSCH reception slot of the UE and a slot in which an associated HARQ feedback window is started. The window size value means the number of consecutive slots (e.g., N value) on which PUCCH opportunities are configured from the start slot of the HARQ feedback window according to the K1 value.

As an example of transmitting the K1 and N values, the K1 and N values may be indicated through respective information regions. In this case, the K1 value may be indicated through DL assignment DCI, and the N value may be semi-statically set through UE-specific or cell-specific higher layer signaling. As another example, all of the K1 and N values may be semi-statically set through UE-specific or cell-specific higher layer signaling. As still another example, all of the K1 and N values may be dynamically set through the DL assignment DCI. As further another example, the K1 value may be semi-statically set through UE-specific or cell-specific higher layer signaling, and the N value may be dynamically set through the DL assignment DCI.

In this case, when the K1 or N value is indicated through the DL assignment DCI, a table for mapping between a setting value by the indication information and an associated actual K1 or N value may be configured through UE-specific or cell-specific RRC signaling. That is, when the K1 value is defined to be indicated through the DL assignment DCI, a mapping table defining an actual K1 value corresponded to each setting value in a K1 indication information region transmitted through a DL assignment DCI format may be configured through UE-specific or cell-specific RRC signaling. Likewise, when the N value is defined to be indicated through the DL assignment DCI, a mapping table defining an actual N value corresponded to each setting value in an N indication information region transmitted through the DL assignment DCI format may be configured through UE-specific or cell-specific RRC signaling.

As another example of transmitting the K1 and N values to the UE, one information region for deriving the N and K1 values, for example, a HARQ window configuration information region may be defined, and the K1 and N values may be defined to be set therethrough. That is, the N and K1 values may be defined to be derived according to a corresponding HARQ window configuration setting value. In this case, corresponding HARQ window configuration information may be semi-statically configured through UE-specific or cell-specific higher layer signaling, or be dynamically configured through the DL assignment DCI.

Specifically, a mapping table defining actual K1 and N values corresponded to each HARQ window configuration setting value may be defined. Based on the mapping table, corresponding HARQ window configuration information may be semi-statically configured through UE-specific or cell-specific higher layer signaling, or be dynamically configured through the DL assignment DCI. In this case, when the HARQ window configuration information is dynamically configured through the DL assignment DCI, the mapping table defining actual K1 and N values corresponded to each setting value in a HARQ window configuration indication information region transmitted through the DL assignment DCI may be configured by a base station through UE-specific or cell-specific higher layer signaling.

In another embodiment, the HARQ feedback window may be configured with non-consecutive HARQ feedback windows.

Figure 19:
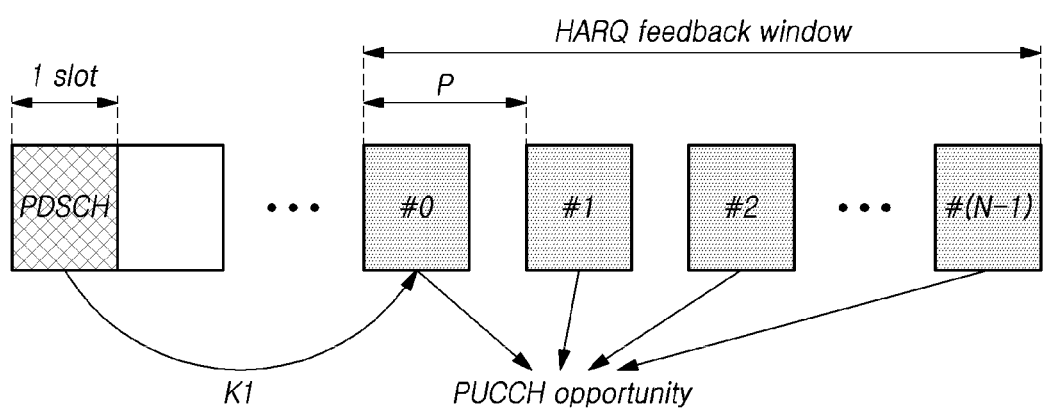

Referring to FIG. 19, a HARQ feedback window may be made up of non-consecutive slots. Accordingly, a base station may transmit, to a UE, a starting slot of the HARQ feedback window (i.e. an offset value) PUCCH opportunity period information, and window size information (i.e. information on the number of PUCCH opportunities). The offset value means a timing gap (e.g., K1 value) between a PDSCH reception slot of the UE and a slot in which an associated HARQ feedback window is started. The window size value means the number of non-consecutive slots (e.g., N value) on which PUCCH opportunities are configured from the start slot of the HARQ feedback window according to the K1 value. The PUCCH opportunity period information means a period, a P value, between slots on which each PUCCH opportunity is configured in the HARQ feedback window.

As an example of transmitting the K1, N and P values to a UE, separate information regions may be defined to indicate the respective K1, N and P values. When respective information regions are defined to indicate the K1, N and P values, since the embodiments/example of defining each information region for transmitting the K1 and N values to a UE, as described above, may be equally applied to specific methods of transmitting the K1, N and P values to the UE, therefore, corresponding discussions are not given repeatedly for convenience of description.

Likewise, as another example of transmitting the K1, N and P values to a UE, one information region for deriving the K1, N and P values, for example, a HARQ window configuration information region may be defined. Through the HARQ window configuration information region, the K1, N and P values may be defined to be set. Since the embodiments/example of defining the HARQ window configuration information region for setting the K1 and N values, and through this, defining the setting of corresponding N and K1 values, as described above, may be equally applied to methods of transmitting a specific HARQ window configuration information region to do this, and according to this, methods of setting K1, N and P values, therefore, corresponding discussions are not given repeatedly for convenience of description.

Additionally, one information region for indicating the K1 value and another information region for setting the N and P values may be defined. Through the defined information regions, the K1, N and P values may be defined to be transmitted to a UE. That is, by defining an offset indication information region for transmitting the offset K1 value and another separate information region for setting the N and P values, for example, a HARQ window configuration information region, the N and P values may be defined to be set through this. In this case, all possible combinations of the methods discussed in the embodiments/example of defining respective information regions for transmitting the K1 and N values to the UE and the methods discussed in the embodiments/example of defining one HARQ window configuration information region for setting the N and K1 values and through this, defining the setting of the N and K1 values, as described above, may be applicable to specific methods of transmitting, to a UE, the offset indication information region for indicating the K1 value and the HARQ window configuration information region for setting the N and P values, corresponding discussions are not given repeatedly for convenience of description.

Additionally, when the HARQ feedback window configuration method described above is applied, each PUCCH opportunity in the HARQ feedback window may be configured with an identical PUCCH resource. That is, a PUCCH resource corresponding to each PUCCH opportunity may be defined to be assigned in an identical PUCCH format and an identical frequency resource. In this case, a PUCCH resource configuring each PUCCH opportunity included in the HARQ feedback window may be defined to share a PUCCH resource according to PUCCH resource assignment information indicated through DL assignment DCI according to a PUCCH resource mapping rule defined in the TS 38.213 document.

In another embodiment, a PUCCH resource configuring each PUCCH opportunity may be a PUCCH resource configured through different sub-bands or bandwidth parts (BWP). That is, frequency hopping may be applied for a PUCCH resource configuring each PUCCH opportunity included in the corresponding HARQ feedback window, and the frequency hopping may be on a sub-band or a bandwidth part (BWP) basis.

Like this, when frequency hopping is defined for each PUCCH opportunity in a HARQ feedback window for a UE, the frequency hopping may be enabled or disabled by a base station, a base station may configure corresponding enabling/disabling indication information and transmit the corresponding enabling/disabling indication information to the UE through UE-specific/cell-specific RRC signaling, DL assignment DCI, or MAC CE signaling.

Further, a sub-band or a bandwidth part BWP for applying frequency hopping for the PUCCH opportunity of the HARQ feedback window may be configured separately from an UL (or DL) bandwidth part (BWP) configured for the UE, and the sub-band or the bandwidth part BWP for applying frequency hopping for the PUCCH opportunity of the HARQ feedback window may be transmitted to the UE through UE-specific/cell-specific RRC signaling. In another embodiment, a sub-band or a bandwidth part BWP for applying frequency hopping for the PUCCH opportunity of the HARQ feedback window may be defined to follow an UL (or DL) bandwidth part (BWP) configured for the UE.

According to the embodiment described above, when frequency hopping for a PUCCH opportunity is defined and applied, a PUCCH resource configuring each PUCCH opportunity may be defined to be assigned according to an ARI indicated through DL assignment DCI according to a PUCCH resource mapping rule defined in the TS 38.213 document for PUCCH resource sets defined in each sub-band or bandwidth part BWP served as a unit of hopping.

Further, in this case, a sub-band or bandwidth part BWP hopping pattern may be defined as a predetermined pattern according to the number of sub-bands or bandwidth parts (BWP) configured for a UE, or be semi-statically configured by a base station through UE-specific/cell-specific higher layer signaling, or be dynamically indicated through a DL assignment DCI format. In this case, when the corresponding hopping pattern is dynamically indicated through the DL assignment DCI format, a sub-band or BWP hopping pattern table for each setting value of a corresponding hopping pattern indication information region may be configured by a base station and be configured through UE-specific/cell-specific higher layer signaling.

In another embodiment, a hopping size for corresponding PUCCH opportunity hopping may be directly configured by a base station and to be directly transmitted to a UE through UE-specific/cell-specific RRC signaling, MAC CE signaling, or DL assignment. The hopping size may be configured on a PRB basis. In this case, a PUCCH resource configuring each PUCCH opportunity according to the configured hopping size may be configured by allowing frequency hopping to be applied to the PUCCH resource. In this case, the frequency hopping may be defined to be performed in the bandwidth part (BWP) or performed in a system bandwidth part of a corresponding carrier.

In another embodiment, the frequency hopping may be applied based on one PUCCH opportunity, that is, per PUCCH opportunity, or based on group of PUCCH opportunities of PUCCH opportunities. That is, when a HARQ feedback window is configured with N PUCCH opportunities, frequency hopping may be applied for each PUCCH opportunity, or be applied based on consecutive M (M<N) PUCCH opportunities. In this case, the M value may be also configured by a base station and transmitted to a UE through UE-specific/cell-specific RRC signaling, MAC CE signaling, or DL assignment DCI.

Additionally, when a HARQ feedback window is configured for a UE in an NR-U cell, UEs may be defined to perform basically the LBT for PUCCH transmission in respective PUCCH opportunities. In this case, when a size value of the HARQ feedback window, a N value, is set as 1, that is, only a single PUCCH opportunity is configured, the UE may be defined to transmit a PUCCH through the PUCCH opportunity without performing the LBT.

According to the embodiments described above, it is possible to provide methods and apparatuses for transmitting HARQ feedback information in an unlicensed band for enabling the HARQ feedback information to be transmitted in response to the reception of a DL data channel in the unlicensed band.

Hereinafter, structures and configurations of a UE and a base station capable of performing a part or all of the embodiments described with reference to FIGS. 1 to 19 will be discussed with reference to the drawings.

Figure 20:
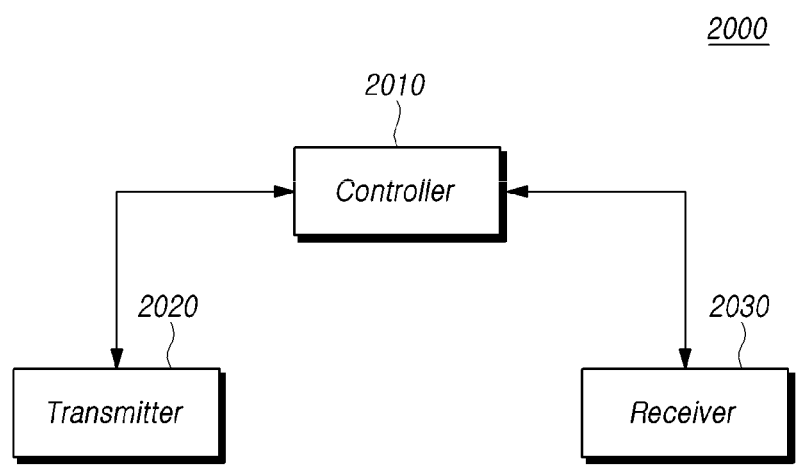
FIG. 20 is a block diagram illustrating a UE in accordance with embodiments of the present disclosure.

FIG. 20 is a block diagram illustrating a UE 2000 in accordance with embodiments of the present disclosure.

Referring to FIG. 20, the UE 2000 includes a controller 2010, a transmitter 2020, and a receiver 2030.

The controller 2010 controls overall operations of the UE 2000 related to methods of transmitting HARQ feedback information in an unlicensed band needed to perform embodiments of the present disclose. The transmitter 2020 transmits UL control information, data, message, etc. through a corresponding channel to a base station. The receiver 2030 receives DL control information and data, message through a corresponding channel from a base station.

In one embodiment, the receiver 2030 receives DL control information including resource assignment information for a DL data channel (PDSCH) in the unlicensed band.

The receiver 2030 may receive the DL data channel from the base station based on the resource assignment information included in the DL control information. The transmitter 2020 may transmit HARQ ACK/NACK feedback information on whether the DL data channel is received to the base station.

The receiver 2030 may receive HARQ timing indication information for transmitting the HARQ feedback information in the unlicensed band.

In NR systems, the receiver 2030 may receive resource assignment, and feedback timing (e.g., K1 value) for an UL control channel (PUCCH) for HARQ feedback through DL assignment DCI. In another embodiment, the feedback timing (e.g., K1 value) may be set through RRC signaling. The transmitter 2020 may transmit HARQ feedback information according to whether the DL data channel is received based on the received resource assignment and feedback timing (e.g., K1 value).

In this case, in the case of using unlicensed bands, when another node occupies a corresponding unlicensed band in a slot according to the K1 value indicated by the base station, it may be difficult for the transmitter 2020 to perform a corresponding PUCCH transmission at a timing indicated by the base station. Accordingly, in one embodiment, the PUCCH transmission of the transmitter 2020 may be triggered by allowing the base station to perform the LBT and then inform the UE of the fact that access is available to the unlicensed band.

In one embodiment, PUCCH transmission triggering information that defines a UE-group common DCI format for the PUCCH transmission triggering may be transmitted through a UE-group common PDCCH. In another embodiment, PUCCH transmission triggering information that defines a UE-specific DCI format for the PUCCH transmission triggering may be transmitted through a UE-specific PDCCH.

In one embodiment, a separately configured PUCCH triggering DCI format may include PUCCH resource assignment information and PUCCH transmission timing information (e.g., K3 value). Here, the K3 value may be set as a timing gap between a reception slot of the PUCCH triggering DCI format and a PUCCH transmission slot of the UE.

In another embodiment, the PUCCH triggering DCI format may include only PUCCH resource assignment information, and the K3 value may be set by the base station through UE-specific/cell-specific higher layer signaling. In another embodiment, the K3 value may be set as a predetermined value, such as a fixed value.

In another embodiment, the PUCCH triggering DCI format may be configured to include only the K3 value. In this case, PUCCH resource assignment information to be transmitted to each UE may be configured to be included in a DL assignment DCI format.

In case a PUCCH resource is assigned for HARQ feedback of the UE for a PDSCH through the separate PUCCH triggering DCI format different from the DL assignment DCI format, configuration or indication information for this may be signaled to the UE from a base station explicitly or implicitly.

In one embodiment, a base station may configure (e.g., determine, indicate) whether PUCCH resource assignment is performed through the PUCCH triggering DCI format through UE-specific or cell-specific RRC signaling. In this case, based on the configuration information on whether the PUCCH resource is assigned for HARQ feedback through the separate PUCCH triggering DCI format, the controller 2010 may determine whether to receive PUCCH resource assignment information through a PUCCH resource indicator included in the DL assignment DCI format or whether to receive the PUCCH resource assignment information through the separate PUCCH triggering DCI format for the PUCCH resource assignment.

In another embodiment, the configuration information may be indicated through a DL assignment DCI format including PDSCH resource assignment information, DCI format 1_0 or DCI format 1_1. That is, when PDSCH resource assignment is performed, the DL assignment DCI format may include postponement indication information for indicating whether the transmission of HARQ feedback information is required to be postponed. It may mean that information on whether the PUCCH resource assignment information is performed through the PUCCH resource indicator of the DL assignment DCI format or performed by being postponed through the separate PUCCH triggering DCI format subsequently transmitted is signaled through the DL assignment DCI format.

In this case, in one embodiment, the DL assignment DCI format may include a separate information region for indicating the postponement indication information, for example, a PUCCH allocation flag information region, or the like. In another embodiment, the DL assignment DCI format may be configured to indicate this by using a typical information region, for example, a PUCCH resource indicator information region.

The corresponding information may be implicitly signaled. In one embodiment, the postponement indication information may be indicated according to a K1 value indicated through the DL assignment DCI format. That is, when the K1 value is greater than or equal to a specific threshold, a PUCCH resource assignment may be indicated through the separate PUCCH triggering DCI format. In another embodiment, when the K1 value is less than the specific threshold, the PUCCH resource assignment may be performed through the PUCCH resource indicator of the DL assignment DCI format. In this case, the specific threshold may be fixed as a specific value or set by a base station through cell-specific/UE-specific RRC signaling.

The transmitter 2020 may transmit HARQ feedback information in the unlicensed band according to the HARQ timing indication information.

When the PUCCH resource assignment is performed through the PUCCH resource indicator of the DL assignment DCI format, the transmitter 2020 may transmit the HARQ feedback information according to the received resource assignment information.

Unlike this, when postponement for the transmission of the HARQ feedback information is indicated, that is, when the PUCCH resource assignment is indicated through the PUCCH triggering DCI format, the controller 2010 may postpone the transmission of the HARQ feedback information until receiving resource assignment information and timing information for transmitting the HARQ feedback information from the base station. The receiver 2030 may receive the PUCCH triggering DCI format after receiving the DL assignment DCI format. The transmitter 2020 may transmit the HARQ feedback information according to resource assignment information and timing information for an UL control channel included in the PUCCH triggering DCI format. In this case, when receiving the PUCCH triggering DCI format, the transmitter 2020 may transmit all pending HARQ ACK feedback information through the corresponding PUCCH.

According to the embodiments described above, it is possible to provide methods and apparatuses for transmitting HARQ feedback information in an unlicensed band for enabling the HARQ feedback information to be transmitted in response to the reception of a DL data channel in the unlicensed band.

Hereinbefore, the embodiments have been described based on a situation transmitting HARQ feedback information as UL control information (UCI); however, embodiments of the present disclosure are not limited thereto. For example, in accordance with embodiments of the present disclosure, when other UCI such as CQI/CSI reporting or SR other than HARQ feedback is present before a PUCCH triggering DCI format is received, the transmitter may transmit all pending UCI through the corresponding PUCCH.

In this case, a base station may set a maximum payload size or a maximum codebook size that can be transmitted through any PUCCH. Further, the set maximum payload size or maximum codebook size may be transmitted to the UE through UE-specific/cell-specific higher layer signaling, MAC CE signaling, or L1 control signaling. In this case, when the controller 2010 performs corresponding PUCCH transmission according to the reception of the PUCCH triggering DCI format, if a payload size of pending UCI exceeds the maximum payload size, specific UCI may be configured to be dropped.

In one embodiment, a priority rule for the UCI dropping may be set. For example, a priority for each UCI type may be set. As one example of defining the priority for each UCI type, priorities may be defined in order of SR>HARQ ACK feedback>CQI/CSI reporting. In another example, priorities may be defined in the order of SR=HARQ ACK feedback>CQI/CSI reporting. However, this is an example; thus, embodiments of the present disclosure are not limited thereto. All embodiments setting a priority for each UCI type in addition these examples may be included within the scope of the present disclosure. Further, when dropping occurs for any of UCIs of an equal priority or an equal type, the dropping may be performed in order, or in reverse order, of occurrence of the UCIs.

According to the embodiments described above, it is possible to provide methods and apparatuses for transmitting an uplink control channel (PUCCH) including various uplink control information in an unlicensed band.

Figure 21:
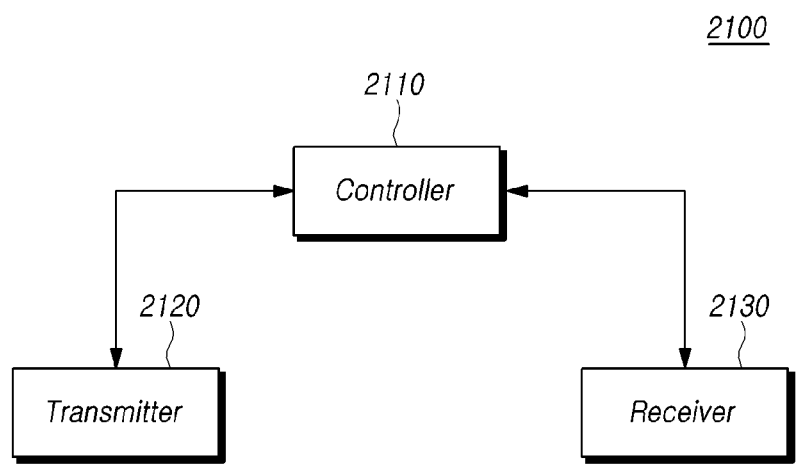
FIG. 21 is a block diagram illustrating a base station in accordance with embodiments of the present disclosure.

FIG. 21 is a block diagram illustrating a base station 2100 in accordance with embodiments of the present disclosure.

Referring to FIG. 21, the base station 2100 includes a controller 2110, a transmitter 2120, and a receiver 2130.

The controller 2110 controls overall operations of the base station 2100 related to methods of transmitting HARQ feedback information in an unlicensed band needed to perform embodiments of the present disclose. The transmitter 2120 and the receiver 2130 are configured to transmit, to a UE and receive from the UE, signals, messages, and data necessary for performing embodiments of the present disclosure.

In one embodiment, the transmitter 2120 transmits, to a UE, DL control information including resource assignment information for a DL data channel (PDSCH) in the unlicensed band.

The transmitter 2120 may transmit the DL data channel to the UE based on the resource assignment information included in the DL control information. The receiver 2130 may receive HARQ ACK/NACK feedback information on whether the DL data channel is received from the UE.

The transmitter 2120 may transmit HARQ timing indication information for receiving the HARQ feedback information in the unlicensed band.

In NR systems, the transmitter 2120 may transmit resource assignment and feedback timing (e.g., K1 value) for an UL control channel (PUCCH) for HARQ feedback through DL assignment DCI. In another embodiment, the feedback timing (e.g., K1 value) may be set through RRC signaling. The receiver 2130 may receive HARQ feedback information according to whether the DL data channel is received based on the transmitted resource assignment and feedback timing (e.g., K1 value).

In this case, in the case of using unlicensed bands, when another node occupies a corresponding unlicensed band in a slot according to the K1 value indicated by the base station, it may be difficult for the UE to perform a corresponding PUCCH transmission at a timing indicated by the base station. Accordingly, in one embodiment, the PUCCH transmission of the UE may be triggered by allowing the base station to perform the LBT and then inform the UE of the fact that access is available to the unlicensed band.

In one embodiment, PUCCH transmission triggering information that defines a UE-group common DCI format for the PUCCH transmission triggering may be transmitted through a UE-group common PDCCH. In another example, PUCCH transmission triggering information that defines a UE-specific DCI format for the PUCCH transmission triggering may be transmitted through a UE-specific PDCCH.

In one embodiment, a separately configured PUCCH triggering DCI format may include PUCCH resource assignment information and PUCCH transmission timing information (e.g., K3 value). Here, the K3 value may be set as a timing gap between a reception slot of the PUCCH triggering DCI format and a PUCCH transmission slot of a UE.

In another embodiment, the PUCCH triggering DCI format may include only PUCCH resource assignment information, and the K3 value may be set by the base station through UE-specific/cell-specific higher layer signaling. In still another embodiment, the K3 value may be set as a predetermined value, such as a fixed value.

In further another example, the PUCCH triggering DCI format may be configured to include only the K3 value. In this case, PUCCH resource assignment information to be transmitted to each UE may be configured to be included in a DL assignment DCI format.

In case a PUCCH resource is assigned for HARQ feedback of a UE for a PDSCH through the separate PUCCH triggering DCI format different from the DL assignment DCI format, configuration or indication information for this may be signaled to the UE from the base station explicitly or implicitly.

In one embodiment, the base station may configure (e.g., determine or indicate) whether a PUCCH resource is assigned through the PUCCH triggering DCI format through UE-specific or cell-specific RRC signaling. In this case, based on the configuration information on whether the PUCCH resource is assigned for HARQ feedback through the separate PUCCH triggering DCI format, the controller

2010 may determine whether to receive PUCCH resource assignment information through a PUCCH resource indicator included in the DL assignment DCI format or whether to receive the PUCCH resource assignment information through the separate PUCCH triggering DCI format for the PUCCH resource assignment.

In another embodiment, the configuration information may be indicated through a DL assignment DCI format including PDSCH resource assignment information, DCI format 1_0 or DCI format 1_1. That is, when PDSCH resource assignment is performed, the DL assignment DCI format may include postponement indication information for indicating whether the transmission of HARQ feedback information is required to be postponed. This may mean that information on whether the PUCCH resource assignment information is performed through the PUCCH resource indicator of the DL assignment DCI format, or performed by being postponed through the separate PUCCH triggering DCI format subsequently transmitted is signaled through the DL assignment DCI format.

For example, in this case, the DL assignment DCI format may include a separate information region for indicating the postponement indication information, a PUCCH allocation flag information region, or the like. As another example, the DL assignment DCI format may be configured to indicate this by using a typical information region, for example, a PUCCH resource indicator information region.

As still another example, the corresponding information may be implicitly signaled. In one embodiment, the postponement indication information may be indicated according to a K1 value indicated through the DL assignment DCI format. That is, when the K1 value is greater than or equal to a specific threshold, a PUCCH resource assignment may be indicated through the separate PUCCH triggering DCI format. In another embodiment, when the K1 value is less than the specific threshold, the PUCCH resource assignment may be performed through the PUCCH resource indicator of the DL assignment DCI format. In this case, the specific threshold may be fixed as a specific value, or set by the base station through cell-specific/UE-specific RRC signaling.

The receiver 2130 may receive HARQ feedback information in the unlicensed band according to the HARQ timing indication information.

When the PUCCH resource assignment is performed through the PUCCH resource indicator of the DL assignment DCI format, the receiver 2130 may receive the HARQ feedback information according to the transmitted resource assignment information.

Unlike this, when postponement for the transmission of the HARQ feedback information is indicated, that is, when the PUCCH resource assignment is indicated through the PUCCH triggering DCI format, the UE may postpone the transmission of the HARQ feedback information until receiving resource assignment information and timing information for transmitting the HARQ feedback information from the transmitter 2120. The transmitter 2120 may transmit the PUCCH triggering DCI format after transmitting the DL assignment DCI format. The receiver 2130 may receive the HARQ feedback information according to resource assignment information and timing information for an UL control channel included in the PUCCH triggering DCI format. In this case, the receiver 2130 may receive all pending HARQ ACK feedback information through the corresponding PUCCH when the PUCCH triggering DCI format is received.

According to the embodiments described above, it is possible to provide methods and apparatuses for transmitting HARQ feedback information in an unlicensed band for enabling the HARQ feedback information to be transmitted in response to the reception of a DL data channel in the unlicensed band.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method of a user equipment (UE) for transmitting hybrid automatic repeat request (HARQ) feedback information in an unlicensed band, the method comprising:

receiving downlink control information including resource assignment information for a downlink data channel (PDSCH) in the unlicensed band;

receiving HARQ timing indication information for transmission of the HARQ feedback information in the unlicensed band; and transmitting the HARQ feedback information in the unlicensed band according to the HARQ timing indication information, wherein the downlink control information includes postponement indication information for indicating whether the transmission of the HARQ feedback information is required to be postponed.

2. The method according to claim 1, wherein the postponement indication information is determined based on the HARQ timing indication information included in the downlink control information.

3. The method according to claim 1, wherein when postponement for the transmitting of the HARQ feedback information is indicated, the transmitting of the HARQ feedback information is performed according to resource assignment information for an uplink control channel included in different downlink control information received after the downlink control information is received.

4. The method according to claim 1, wherein the HARQ timing indication information is included in the downlink control information or included in the different downlink control information received after the downlink control information is received.

5. A method of a base station for receiving hybrid automatic repeat request (HARQ) feedback information in an unlicensed band, the method comprising:

transmitting downlink control information including resource assignment information for a downlink data channel (PDSCH) in the unlicensed band;

transmitting HARQ timing indication information for transmission of the HARQ feedback information in the unlicensed band; and receiving the HARQ feedback information in the unlicensed band according to the HARQ timing indication information, wherein the downlink control information includes postponement indication information for indicating whether the transmission of the HARQ feedback information is required to be postponed.

6. The method according to claim 5, wherein the postponement indication information is determined based on the HARQ timing indication information included in the downlink control information.

7. The method according to claim 5, wherein when postponement for the transmission of the HARQ feedback information is indicated, the receiving of the HARQ feedback information is performed according to resource assignment information for an uplink control channel included in different downlink control information transmitted after the downlink control information is transmitted.

8. The method according to claim 5, wherein the HARQ timing indication information is included in the downlink control information or included in the different downlink control information transmitted after the downlink control information is transmitted.

9. A user equipment (UE) for transmitting hybrid automatic repeat request (HARQ) feedback information in an unlicensed band, the user equipment comprising:

a receiver configured to receive downlink control information including resource assignment information for a downlink data channel (PDSCH) in the unlicensed band, and receive HARQ timing indication information for transmission of the HARQ feedback information in the unlicensed band; and a transmitter configured to transmit the HARQ feedback information in the unlicensed band according to the HARQ timing indication information, wherein the downlink control information includes postponement indication information for indicating whether the transmission of the HARQ feedback information is required to be postponed.

10. The user equipment according to claim 9, wherein the postponement indication information is determined based on the HARQ timing indication information included in the downlink control information.

11. The user equipment according to claim 9, wherein when postponement for the transmitting of the HARQ feedback information is indicated, the transmitter transmits the HARQ feedback information according to resource assignment information for an uplink control channel included in different downlink control information received after the downlink control information is received.

12. The user equipment according to claim 9, wherein the HARQ timing indication information is included in the downlink control information or included in the different downlink control information received after the downlink control information is received.

* * * * *